May 24, 1927.
H. E. CAMPBELL
1,629,951
STARTING BOX FOR CONTROLLING THE ELECTRIC CURRENT TO MACHINE MOTORS
Filed Oct. 12, 1922    2 Sheets-Sheet 1
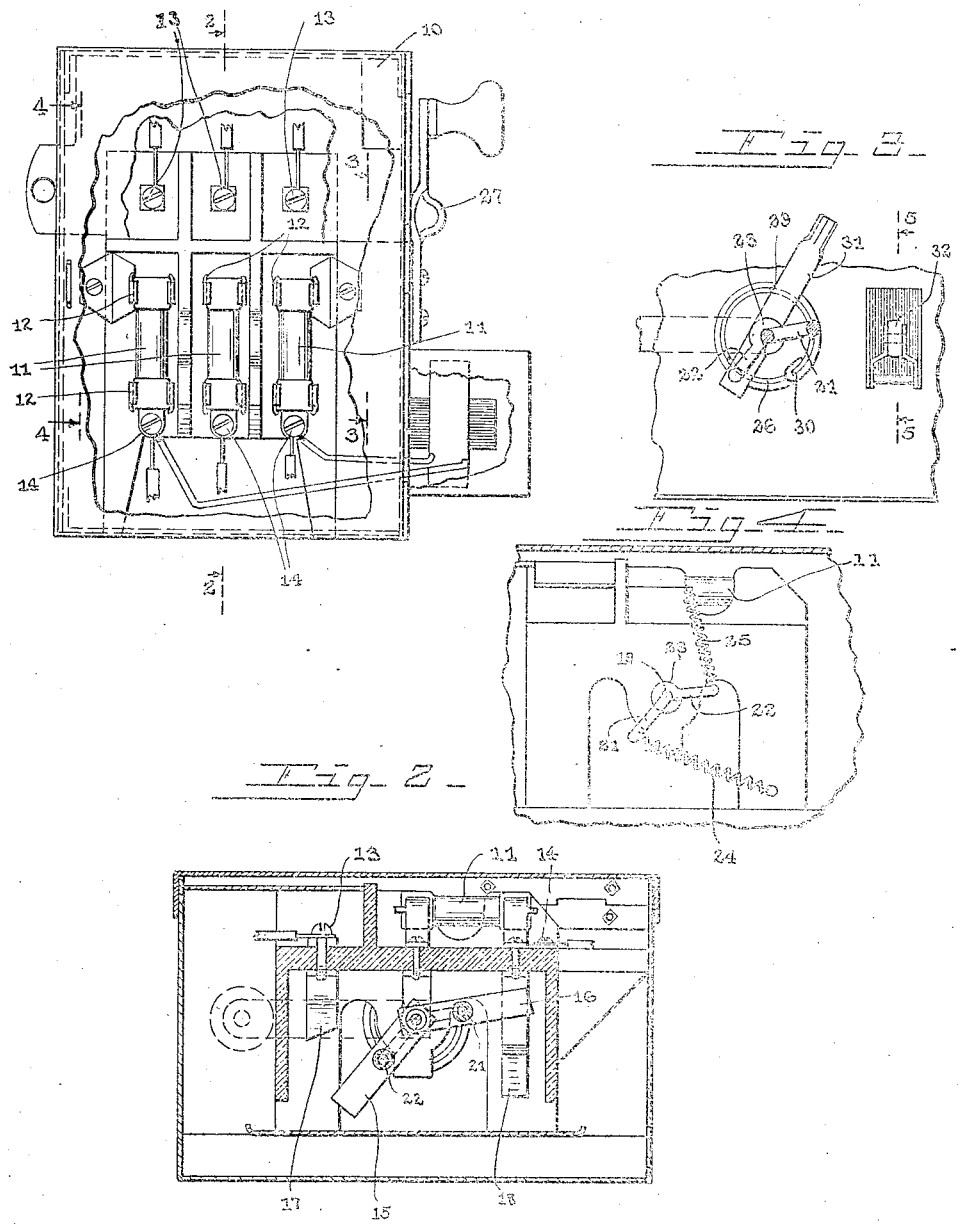
INVENTOR.
Harry E. Campbell
BY Morsell & Keeney
ATTORNEYS.

May 24, 1927.
H. E. CAMPBELL
1,629,951
STARTING BOX FOR CONTROLLING THE ELECTRIC CURRENT TO MACHINE MOTORS
Filed Oct. 12, 1922    2 Sheets-Sheet 2
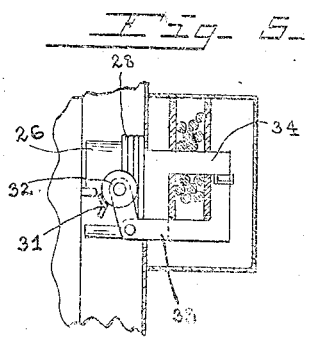
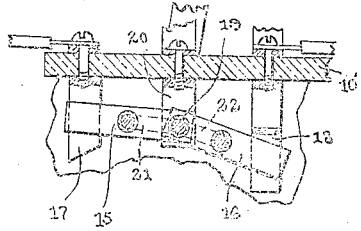
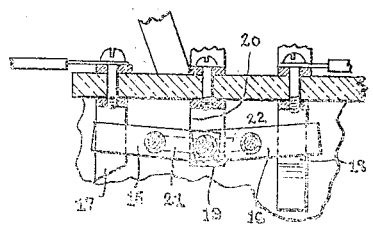
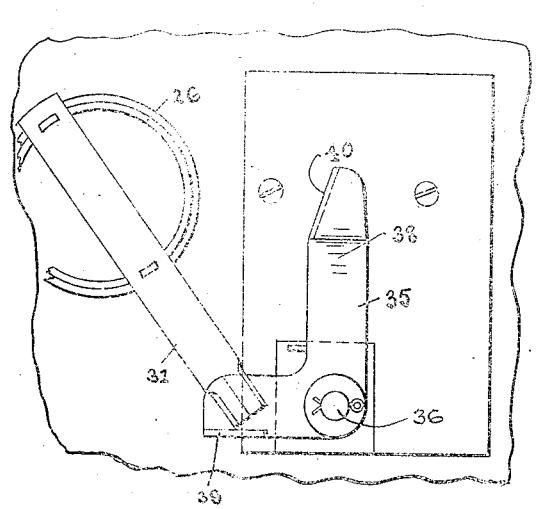
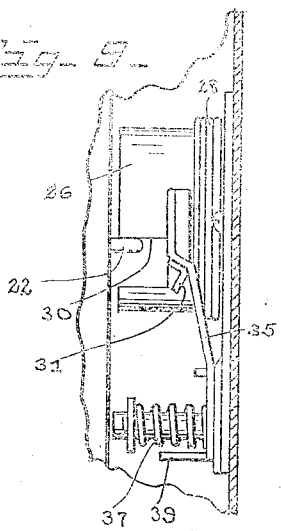
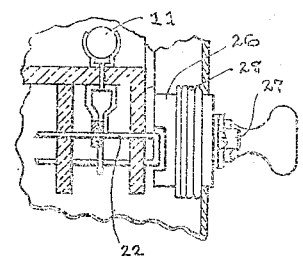
INVENTOR.
Harry E. Campbell
BY
ATTORNEYS.

Patented May 24, 1927.

1,629,951

UNITED STATES PATENT OFFICE.

HARRY E. CAMPBELL, OF MILWAUKEE, WISCONSIN, ASSIGNOR TO UNION ELECTRIC MANUFACTURING COMPANY, OF MILWAUKEE, WISCONSIN, A CORPORATION OF WISCONSIN.

STARTING BOX FOR CONTROLLING THE ELECTRIC CURRENT TO MACHINE MOTORS.

Application filed October 12, 1922. Serial No. 594,106.

This invention relates to starting boxes for controlling the electric current to machine motors and the like, and more particularly to a device of this character having a safety means for preventing the accidental restarting of the motor after the current has dropped below a predetermined point.

The invention further contemplates the provision of means wherein the fuses, forming a part of the controlling device, are automatically cut out of the circuit when the motor is started, so as to prevent their disruption because of the necessarily heavier current during the starting operation. However, in the running position of the motor in which a normal current is used, means are provided for including in the circuit these fuses so as to protect the motor.

In the preferred embodiment of the invention about to be described, there is provided a switch handle which is held in "on" position my a magnetically controlled device which receives its energy from the motor circuit. Spring means may be further provided for normally tending to hold the switch in "off" position. Therefore, in the event that the current supplied to the motor falls below a predetermined amount, the strength of the magnet is insufficient to retain the control in "on" position, whereupon the springs return the same to "off" position, thereby cutting off the current to the motor.

The novel combination, construction and arrangement of parts whereby the advantages sought to be obtained by this invention are efficiently accomplished, will be made more apparent as the description proceeds, especially when taken in consideration with the accompanying drawings.

In the drawings:

Figure 1 is a front elevation of the improved device forming the subject matter of this invention, certain parts being broken away to show the interior construction;

Fig. 2 is a sectional view taken on the plane indicated by the line 2—2 in Fig. 1;

Fig. 3 is a sectional view taken on the plane indicated by the line 3—3 in Fig. 1, showing means for locking the handle in the running position of the motor;

Fig. 4 is a sectional view taken on the plane indicated by the line 4—4 in Fig. 1;

Fig. 5 is a fragmentary sectional view taken on the plane indicated by the line 5—5 in Fig. 3;

Fig. 6 is a sectional detail view showing the switch blades in starting position;

Fig. 7 is a similar view showing the switch blades in running position;

Fig. 8 is a modified form of the switch retaining means;

Fig. 9 is a view taken at right angles to Fig. 8; and

Fig. 10 is a fragmentary sectional view.

Referring now more particularly to Figs. 1 to 7 and 10 the preferred embodiment of this invention will be described. In these figures it will be seen that there is illustrated a casing 10 in which is enclosed most of the mechanism, this mechanism including a plurality of fuses 11 which are removably secured in place by clips 12, in the usual manner, so that the same may be renewed at will. In Fig. 1 there is illustrated terminals 13, adapted to be connected to a source of electric current, and terminals 14 which connect with the motor to be driven.

Interposed between the terminals 13 and the fuses 11 are two switches, numbered 15 and 16 respectively, the switch 15 being adapted to co-operate with a pair of switch blades 17, while the switch 16 is adapted to engage a pair of blades 18.

The switch blades 15 and 16 are mounted on a stub shaft 19, supported in a suitable bracket 20, projecting from a portion of the switch block 10' formed of insulating material and easily removably positioned within the casing 10. For operating the switch blades 15 and 16 the following structure is provided.

In axial line with the shaft 19 is provided a right angular arm 21, the end of which extends through the switch blade 15. An arm 22, provided with an eye 23 which surrounds the shaft arm 21, extends through the switch blade 16. A coiled spring 24 connected at one end to the angular arm 21, and on the other end to the switch block in the casing, and a spring 25 connected respectively to the arm 22 and the block, tend to rotate the blades 15 and 16 so as to maintain them in "off" position.

Positioned within the casing is a drum 26, an operating lever 27 being fixed to this drum and disposed on the outer side of the casing 10. A coiled spring 28 surrounds the drum to hold it in position. One end of this spring is attached to the drum, and the other to the casing, whereby this spring normally tends to return the drum and handle to "off" position when a magnetic holding means, yet to be described, is demagnetized by a failure of the electric current. When the handle lever 27 is in running position it also serves to prevent the opening of the casing door 28' as it is in the path of movement of said door towards open position. The end of the drum opposite from the handle 27 is recessed to form shoulders 29 and 30, adapted to engage the angular arms 21 and 22, which are connected to the switch blades 15 and 16. A comparison of Figs. 2, 6, and 7 will show the three positions of the switch blade 15 with reference to the pairs of blades 17 and 18. The "off" position of the switch blades are illustrated in Fig. 2. Upon the first movement of the handle 27 the blades are moved to the position illustrated in Fig. 6, which is the starting position, and on further movement of the handle the blades assume the position illustrated in Fig. 7, which is a running position. The pair of blades 17 are the starting blades, while the pair of blades 18 are the running blades in which the fuses are included in the circuit.

In the "off-position," the switch blades and fuses are entirely disconnected from the supply circuit which is connected to the upper switch clips. In the "starting-position," illustrated in Figure 6, the fuses are short circuited by the switch blades 16 and the motor is connected to the supply circuit by the switch blades 15. In the "running-position," the blades 15 remain in the same position, but the upper blades 16 disengage from the short circuiting clips 18, placing the fuses in circuit without opening the circuit to the motor. In switching to "off-position," the blades 15 snap out of engagement with the clips 17.

For maintaining the control arm 27 in "on" position against the action of the springs tending to move it in the opposite direction, there is provided a locking arm 31 fixed to rotate with the drum 26 and adapted to snap past a roller 32, journalled on the inner end of a bell-crank armature 33, forming a part of an electro-magnet 34. This electro-magnet is included in the circuit to the motor, so that when the motor is running the magnet will be energized and the arm 31 held in a position which maintains the drum operating handle in "on" position. However, when failure of the current occurs, the magnet 34 will be immediately de-energized and the action of the spring 28 on the arm 31 will cause this arm to move back past the roller 32, whereupon the drum, and with it the switch blades 15 and 16, will be returned to "off" position.

Referring now to Figs. 8 and 9, there is illustrated a modified form of the locking means for the drum and control lever, and inasmuch as the other portions of this modification are similar to those illustrated in Figs. 1 to 7 and 10, like reference characters will indicate corresponding parts.

In these two figures it will be noted that there is illustrated a bell-crank lever 35, pivoted as at 36, and a coiled spring 37 surrounding the pivot 36 and bearing against the lever 35, thereby tending to hold the same in any position to which it may be moved. The bell-crank lever is provided with an angular face 38, a shoulder 39, and a second angular face 40. The arm 31, connected to the drum 26, is moved so as to slide over the angular face 40, thus rotating the bell-crank lever about its pivot 36 so that the arm 31 may swing downwardly to a position to engage the shoulder 39, thereby swinging the lever 35 to the position illustrated in Fig. 8. This is the "on" position of the parts, and after the motor has started, the handle is released or permitted to swing a partial turn until the arm or lever 31 engages the angular face 38 of the lever 35, where it will be held, and in which position the switch arms will still be in running position. When it is desired to move the parts to "off" position, the handle will be manually moved so as to cause the arm 31 to snap over the shoulder of the lever 35. As mentioned, this is accomplished manually as distinguished from the automatic release described with the preferred embodiment of the invention.

From the foregoing it will be obvious that there is provided in the first instance a controlling device wherein fuses which are normally included in the circuit to the motor, are cut out, this occurring during the starting of the motor wherein a larger amount of current is employed. As the motor is started the switch is operated to cut into the circuit the fuses so that the motor circuit may be protected from excess current. Furthermore in the preferred embodiment of the invention the motor circuit is further protected by the provision of the magnetically controlled locking device wherein the parts are returned to "off" position when the magnetic device is de-energized.

These advantages are accomplished by a structure which is relatively simple and comprises few parts whereby the same may be assembled with facility.

While two embodiments of the invention are described and illustrated herein, it is not intended that the invention be unnecessarily limited but reservation is made to make such changes in the specific construction illustrated as may come within the purview of the accompanying claims.

Having thus described the invention what is claimed is:

1. In a controlling device of the class described, a casing, two sets of switch contacts mounted within the casing, a set of switch blades cooperating with each set of contacts, a drum mounted within the casing, connections between the drum and switch blades for moving the latter into engagement with said contacts and means for normally urging the drum in a direction to normally urge the switch blades from engagement with the contacts.

2. In a controlling device of the class described, a casing, two sets of switch contacts mounted within the casing, a set of switch blades cooperating with each set of contacts, arms within the casing having connection with said switch blades, a drum mounted within the casing, an operating lever carried by said drum and having connection with said arms for moving the switch blades into engagement with said contacts, and spring means for normally urging the drum and lever in a direction to disengage the switch blades from said contacts.

In testimony whereof, I affix my signature.

HARRY E. CAMPBELL.